3,445,629
WEB EDGE HEATING ELEMENT
Sven Olof Soren Stark and Peter K. Giacomelli, Lund, Sweden, assignors to AB Tetra Pak, Lund, Sweden, a Swedish company
Filed Aug. 4, 1966, Ser. No. 570,213
Claims priority, application Sweden, Aug. 18, 1965, 10,778/65
Int. Cl. F27b 9/06
U.S. Cl. 219—388                          3 Claims

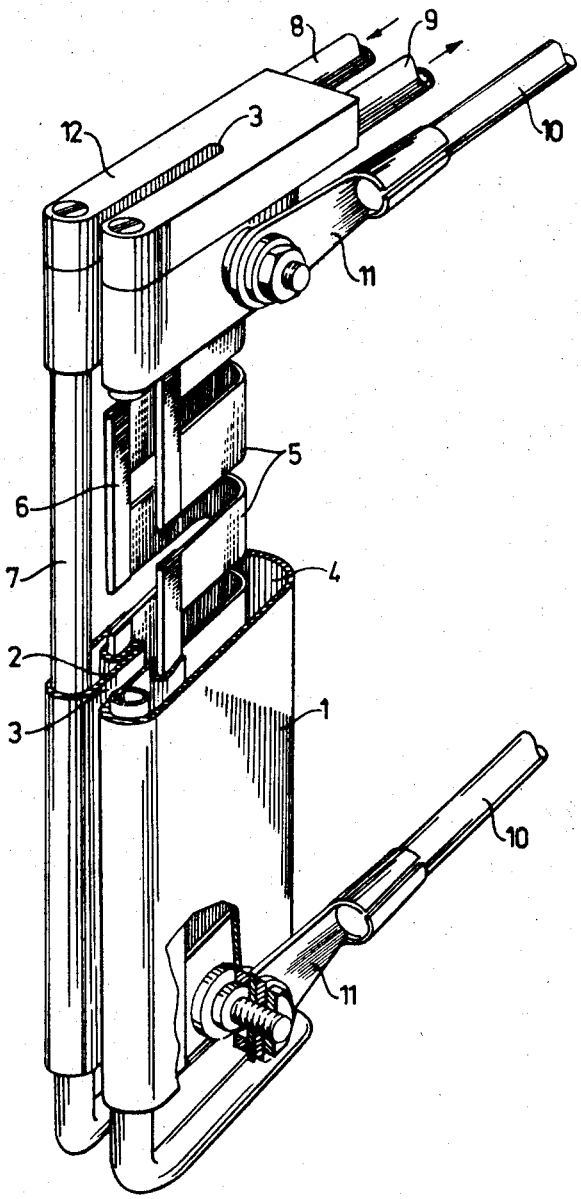

ABSTRACT OF THE DISCLOSURE

A web edge heating element for heating the edge of a continuously moving web which passes through a gap in the heater.

---

The present invention relates to a heating element intended to heat the edge of a web shaped material, preferably in connection with the providing of a longitudinal seam in such a material bent into tube form.

The element according to the invention is characterized by a heating chamber which is provided with a narrow gap formed opening which extends along the whole length of the element and along which the web shaped material is intended to be fed with its edge inserted into the heating chamber.

When providing a longitudinal seam on a web shaped material bent to tube form, one has previously utilized contact heating devices, e.g. heating jaws. The material has been pressed together into e.g. an overlapping zone, using these jaws, whereby the heat has been led through the material into the sealing zone proper. Difficulties have hereby arisen when determining time, pressure and temperature for the seal.

Thanks to the fact that according to the present invention, it is possible to heat the surface to be sealed, directly, the material need not be heated all through whereby the heating can take place quicker, and simultaneously it will be easier to adjust the temperature. After the heating treatment the pressing together of the joint is provided by means of pressing jaws or pressing rolls which, consequently, do not have to be heated.

Preferably, at least the outer portion of the gap formed opening is cooled, e.g. by cooling pipes, extending along both sides, whereby this portion can serve as a guide for the web shaped material.

In the embodiment of the invention shown, the heating chamber is provided by a plate, bent to U-form, the legs of the plate being bent inwards against the bottom of the U, providing between themselves the gap formed opening. At the ends of the legs there may be arranged a holding device including e.g. a dovetail trace arranged to hold U-formed heating strips concentrically with the U-formed plate. Alternatively, the heat can be provided by means of hot air or the like. E.g. in the heating chamber there may be arranged one or more heating air nozzles directed towards the edge of the web shaped material.

Preferably, the heating element is mounted swingable in the machine stand, or in any other way removable relative to the web shaped material at least to such an extent that the edge of the material will be situated outside the hot portion of the heating chamber. This is made use of at accidental machine stops, whereby the element need not be turned off, but can be quickly put into function again.

The invention will be described more in detail in the following under reference to the enclosed drawing which by way of example shows an embodiment of the element according to the invention.

In the embodiment, shown, a plate 1 is bent to U-form with the free ends of its legs 2 inwardly bent towards the bottom of the U, whereby there are provided on one hand an opening gap, and on the other hand a heating chamber 4. The heating chamber 4 is heated by means of U-formed heating strips 5 arranged concentrically in relation to the plate 1, the heating strips 5 being mounted at the free ends of their legs in longitudinal bus bars, the longitudinal bus bars 6 in their turn being insulatedly fixed to inwardly bent shank ends of the plate 1. Inside the inwardly bent shank ends of the plate 1 there are on both sides of the opening gap 3 arranged cooling pipes 7. Into these pipes coolant is fed through a conduit 8 and led away through a conduit 9. The heating strips 5 are connected to a source of current via electric wires 10 and cable clips 11. Finally, 12 stands for a holding body, which is intended to be mounted in e.g. a packaging machine. The element is hereby mounted in such a way in relation to the web shaped material, the edge of which is to be heated, that this edge is made to run through the opening gap 3. Owing to the fact that the outer portion of the opening gap 3 is cooled, this portion can serve as a guiding for the material. Preferably, the element is arranged removable in such a way in relation to the web shaped material, that at machine stops it is possible to bring the element and the material apart from each other at least so far that the edge of the material will be situated outside the hot portion of the heating chamber.

Preferably, the element according to the invention is intended to be used in such packaging machines where the starting material is web-shaped, said material being tube formed and thereupon formed to provide pillow like, tetrahedron shaped packages, or the like in a following flat-pressing and transverse sealing operation. The element is hereby used for heating the edge of the material before this is pressed together, overlapping in relation to the other material edge providing of an overlapping joint.

The invention is of course not restricted to the embodiment shown, but can be varied within the scope of the following claims. E.g. it is possible to use hot air nozzles or the like as a source of heat instead of the heating strips 5 shown. Further, the individual details of the construction can of course be formed in many ways.

That which is claimed is:

1. A compact heater for treating the edge of a moving web of material comprising a generally U-shaped plate defining an open-sided heating chamber, a portion of the plate adjacent the end of each leg of the U being turned inwardly and extending generally parallel to each other to define an elongate slot for receiving an edge of web material into said chamber, a fluid-conducting tube positioned at the end of each leg between the inwardly turned end portion of the plate and the portion of the plate defining the adjacent leg of the U, said tube extending along the length of said slot to provide a cooling medium to the outer portion thereof, and an electrically conductive bar secured to the inner end of each inwardly turned portion of the plate and extending along the inner portion of said slot, a plurality of spaced U-shaped heating elements positioned in said chamber with their leg portions supportably attached to the bars, and means for supplying an electrical current to said bars for heating said elements in said chamber.

2. Apparatus as defined in claim 1 wherein the inner end of each inwardly turned portion of the plate is crimped about the adjacent bar to secure the same in said chamber.

3. Apparatus as defined in claim 1 wherein the tubes are interconnected at one end of said heating chamber, and further including means for supplying a cooling fluid to said tubes located at the other end of said heating chamber.

References Cited

UNITED STATES PATENTS

| | | | |
|---|---|---|---|
| 1,981,629 | 11/1934 | Northrup | 219—10.43 |
| 2,873,344 | 2/1959 | Kocks et al. | 219—10.61 X |
| 3,257,542 | 6/1966 | Hultgreen | 219—343 X |
| 3,131,623 | 5/1964 | Seefluth | 219—388 X |

BERNARD A. GILHEANY, *Primary Examiner.*

R. N. ENVALL, JR., *Assistant Examiner.*

U.S. Cl. X.R.

219—343